US011250874B2

(12) United States Patent
Krishnamoorthy et al.

(10) Patent No.: US 11,250,874 B2
(45) Date of Patent: Feb. 15, 2022

(54) AUDIO QUALITY ENHANCEMENT SYSTEM (71) Applicant: BANK OF AMERICA CORPORATION, Charlotte, NC (US)

(72) Inventors: MadhuSudhanan Krishnamoorthy, Chennai (IN); Harikrishnan Rajeev, Trivandrum (IN)

(73) Assignee: Bank of America Corporation, Charlotte, NC (US)

( * ) Notice: Subject to any disclaimer, the term of this patent is extended or adjusted under 35 U.S.C. 154(b) by 61 days.

(21) Appl. No.: 16/880,487

(22) Filed: May 21, 2020

(65) Prior Publication Data
US 2021/0366507 A1 Nov. 25, 2021

(51) Int. Cl.
*G10L 25/60* (2013.01)
*H04M 3/51* (2006.01)
*G10L 21/0272* (2013.01)
*G10L 25/30* (2013.01)
*G10L 15/26* (2006.01)

(52) U.S. Cl.
CPC .............. *G10L 25/60* (2013.01); *G10L 15/26* (2013.01); *G10L 21/0272* (2013.01); *G10L 25/30* (2013.01); *H04M 3/5175* (2013.01)

(58) Field of Classification Search
CPC ......... G10L 25/60; G10L 15/26; G10L 25/30; G10L 21/0272; H04M 3/5175
See application file for complete search history.

(56) References Cited

U.S. PATENT DOCUMENTS

| | | | |
|---|---|---|---|
| 4,899,109 | A | 2/1990 | Tropp et al. |
| 6,564,088 | B1 | 5/2003 | Soller et al. |
| 6,707,548 | B2 | 3/2004 | Kreimer et al. |
| 6,713,263 | B2 | 3/2004 | Schwartz |
| 6,961,599 | B2 | 11/2005 | Lambert et al. |
| 7,148,964 | B2 | 12/2006 | Cunningham et al. |
| 7,292,336 | B2 | 11/2007 | Cunningham et al. |
| 7,398,119 | B2 | 7/2008 | Lambert et al. |
| 7,463,345 | B2 | 12/2008 | Cohen et al. |
| 7,496,220 | B2 | 2/2009 | Izzia et al. |
| 7,676,442 | B2 | 3/2010 | Ben-Hur et al. |
| 7,834,320 | B2 | 11/2010 | Goldberg et al. |
| 7,847,234 | B2 | 12/2010 | Meyers et al. |
| 8,053,715 | B2 | 11/2011 | Meyers et al. |

(Continued)

OTHER PUBLICATIONS

U.S. Appl. No. 16/880,494, filed May 21, 2020, Krishnamoorthy, et al.

(Continued)

*Primary Examiner* — Michael N Opsasnick (57) ABSTRACT

A language proficiency analyzer automatically evaluates a person's language proficiency by analyzing that person's oral communications with another person. The analyzer first enhances the quality of an audio recording of a conversation between the two people using a neural network that automatically detects loss features in the audio and adds those loss features back into the audio. The analyzer then performs a textual and audio analysis on the improved audio. Through textual analysis, the analyzer uses a multi-attention network to determine how focused one person is on the other and how pleased one person is with the other. Through audio analysis, the analyzer uses a neural network to determine how well one person pronounced words during the conversation.

20 Claims, 7 Drawing Sheets

(56) References Cited

U.S. PATENT DOCUMENTS

| | | |
|---|---|---|
| 8,109,875 B2 | 2/2012 | Gizewski |
| 8,122,849 B2 | 2/2012 | Clarke et al. |
| 8,143,586 B2 | 3/2012 | Inbar |
| 8,308,299 B2 | 11/2012 | Ramella-Roman et al. |
| 8,486,715 B2 | 7/2013 | Pugia et al. |
| 8,517,274 B2 | 8/2013 | Ciurczak et al. |
| 8,644,912 B2 | 2/2014 | Bambot et al. |
| 8,724,875 B2 | 5/2014 | Ojha et al. |
| 8,740,958 B2 | 6/2014 | Anderson et al. |
| 9,025,027 B2 | 5/2015 | Xue et al. |
| 9,173,600 B2 | 11/2015 | Matsiev et al. |
| 9,345,389 B2 | 5/2016 | Nie et al. |
| 9,618,520 B2 | 4/2017 | Bergo |
| 9,689,745 B2 | 6/2017 | Wax et al. |
| 9,867,536 B2 | 1/2018 | Izatt et al. |
| 9,894,338 B2 | 2/2018 | Holub |
| 9,931,040 B2 | 4/2018 | Homyk et al. |
| 10,386,300 B2 | 8/2019 | Wu et al. |
| 10,504,020 B2 | 12/2019 | Trenholm et al. |
| 2011/0058685 A1* | 3/2011 | Sagayama .......... G10L 21/0272 381/98 |
| 2013/0064379 A1* | 3/2013 | Pardo ...................... H04S 7/40 381/56 |
| 2013/0329188 A1 | 12/2013 | Buckland et al. |
| 2014/0132778 A1 | 5/2014 | Holub |
| 2015/0168365 A1 | 6/2015 | Connor |
| 2015/0238135 A1 | 8/2015 | Bambot et al. |
| 2016/0034764 A1 | 2/2016 | Connor |
| 2016/0073886 A1 | 3/2016 | Connor |
| 2016/0112684 A1 | 4/2016 | Connor |
| 2016/0140870 A1 | 5/2016 | Connor |
| 2016/0282594 A1 | 9/2016 | Acosta et al. |
| 2017/0178664 A1* | 6/2017 | Wingate ................. G10L 25/30 |
| 2018/0276540 A1* | 9/2018 | Xing .................... G06N 3/0454 |

OTHER PUBLICATIONS

U.S. Appl. No. 16/880,501, filed May 21, 2020, Krishnamoorthy, et al.

* cited by examiner

AUDIO QUALITY ENHANCEMENT SYSTEM

TECHNICAL FIELD

This disclosure relates generally to the automatic assessment of verbal language proficiency.

BACKGROUND

Verbal language proficiency in a particular language is important when communicating with others in that language.

SUMMARY OF THE DISCLOSURE

Verbal language proficiency in a particular language is important when communicating with others in that language. For example, customer support or technical support often involves a conversation between a support representative and an affected customer. The conversation may be conducted in a language (e.g., English) that is not the native language of the support representative. If the support representative is not sufficiently proficient in that language, the conversation may be difficult to comprehend or unproductive. For example, the support representative may not pronounce or speak certain words correctly (e.g., heavy accent, emphasis on the wrong syllables, inappropriate pauses between words, etc.), thus making the representative difficult to understand. As another example, the support representative may not use or select the correct words (e.g., slang, limited vocabulary, using words out of context, incorrect understanding of the meaning of a word, etc.). As yet another example, even if the support representative selects the correct words and pronounces them properly, the support representative may not speak the words in a kind or engaging way, creating the appearance that the representative is mean or uncaring. Each of these described issues may negatively impact the conversation.

Evaluating language proficiency is an important tool and practice for improving the conversation. However, accurately and consistently evaluating language proficiency in a consistent and accurate manner is a technically challenging and often impossible task. For example, a support representative's supervisor is typically responsible for evaluating the language proficiency of the support representative. However, the supervisor may have frequent or day-to-day interactions with the support representative that train the supervisor's brain to more easily understand the support representative (e.g., understanding the representative despite a heavy accent or usage of slang), creating a perception that the support representative is more proficient in the language than he actually is. Additionally, the representative may change supervisors or managers, which may result in inconsistent and inaccurate evaluations.

This disclosure contemplates a language proficiency analyzer that automatically evaluates a person's language proficiency by analyzing that person's oral communications with another person. The analyzer first enhances the quality of an audio recording of a conversation between the two people using a neural network that automatically detects loss features in the audio and adds those loss features back into the audio. The analyzer then performs a textual and audio analysis on the improved audio. Through textual analysis, the analyzer uses a multi-attention network to determine how focused one person is on the other and how pleased one person is with the other. Through audio analysis, the analyzer uses a neural network to determine how well one person pronounced words during the conversation. In this manner, improves a person's language proficiency by automatically, consistently, and accurately evaluating the various facets of the person's speech. As a result, the language proficiency of an individual and or an entire organization may be improved. Certain embodiments are described below.

According to an embodiment, an apparatus includes a memory and a hardware processor communicatively coupled to the memory. The processor performs a short time Fourier transform on an audio signal to produce a spectrogram image representing the audio signal, compares the spectrogram image with a validation spectrogram image to determine a first feature loss, and adds the first feature loss into the spectrogram image to produce an updated spectrogram image. The processor then compares the first feature loss to a threshold. If the first feature loss is below the threshold, the processor performs an inverse short time Fourier transform on the updated spectrogram image to produce an updated audio signal. If the first feature loss is above the threshold, the processor compares the updated spectrogram image to the validation spectrogram image to determine a second feature loss.

According to an embodiment, an apparatus includes a memory and a hardware processor communicatively coupled to the memory. The processor detects a plurality of spoken words in an audio signal of a conversation between a first person and a second person, generates a text file comprising a plurality of textual words representing the detected plurality of spoken words, and transforms each word in the plurality of textual words into a vector indicative of a meaning of that word to produce a plurality of vectors. The processor analyzes, using a multi-attention network, the plurality of vectors to produce a first score indicative of how attentive the first person was to the second person during the conversation and a second score indicative of how pleased the second person was with the first person during the conversation.

According to an embodiment, an apparatus includes a memory and a hardware processor communicatively coupled to the memory. The processor receives an audio signal of a conversation between a first person and a second person and receives a plurality of vectors corresponding to a plurality of words spoken during the conversation. Each vector of the plurality of vectors indicative of a meaning of a word of the plurality of words. The processor compares the audio signal to the plurality of vectors using a neural network to produce a singular value decomposition and generates, based on the singular value decomposition, a first score indicative of a pronunciation of the plurality of words during the conversation. The processor receives a second score indicative of how attentive the first person was to the second person during the conversation and a second, receives a third score indicative of how pleased the second person was with the first person during the conversation, and combines the first, second, and third scores to produce a fourth score indicative of a performance of the first person during the conversation.

Certain embodiments provide one or more technical advantages. For example, an embodiment automatically, consistently, and accurately evaluates a person's language proficiency. As another example, an embodiment improves the language proficiency of a person or of an entire organization. As yet another example, an embodiment automatically improves the quality of an audio signal. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 4B of the drawings, like numerals being used for like and corresponding parts of the various drawings.

Verbal language proficiency in a particular language is important when communicating with others in that language. For example, customer support or technical support often involves a conversation between a support representative and an affected customer. The conversation may be conducted in a language (e.g., English) that is not the native language of the support representative. If the support representative is not sufficiently proficient in that language, the conversation may be difficult to comprehend or unproductive. For example, the support representative may not pronounce or speak certain words correctly (e.g., heavy accent, emphasis on the wrong syllables, inappropriate pauses between words, etc.), thus making the representative difficult to understand. As another example, the support representative may not use or select the correct words (e.g., slang, limited vocabulary, using words out of context, incorrect understanding of the meaning of a word, etc.). As yet another example, even if the support representative selects the correct words and pronounces them properly, the support representative may not speak the words in a kind or engaging way, creating the appearance that the representative is mean or uncaring. Each of these described issues may negatively impact the conversation.

Evaluating language proficiency is an important tool and practice for improving the conversation. However, accurately and consistently evaluating language proficiency in a consistent and accurate manner is a technically challenging and often impossible task. For example, a support representative's supervisor is typically responsible for evaluating the language proficiency of the support representative. However, the supervisor may have frequent or day-to-day interactions with the support representative that train the supervisor's brain to more easily understand the support representative (e.g., understanding the representative despite a heavy accent or usage of slang), creating a perception that the support representative is more proficient in the language than he actually is. Additionally, the representative may change supervisors or managers, which may result in inconsistent and inaccurate evaluations.

This disclosure contemplates a language proficiency analyzer that automatically evaluates a person's language proficiency by analyzing that person's oral communications with another person. The analyzer first enhances the quality of an audio recording of a conversation between the two people using a neural network that automatically detects loss features in the audio and adds those loss features back into the audio. The analyzer then performs a textual and audio analysis on the improved audio. Through textual analysis, the analyzer uses a multi-attention network to determine how focused one person is on the other and how pleased one person is with the other. Through audio analysis, the analyzer uses a neural network to determine how well one person pronounced words during the conversation. In this manner, the language proficiency analyzer automatically, consistently, and accurately evaluates the various facets of a person's speech and language proficiency. As a result, the language proficiency of an individual and or an entire organization may be improved.

A practical application of the analyzer is that the analyzer automatically improves the audio quality of an audio recording. This allows the recording to be more accurately analyzed. Another practical application of the analyzer is that the analyzer automatically, consistently, and accurately evaluates a person's language proficiency, which may improve the language proficiency of the person or of an entire organization. The system will be described in more detail using FIGS. 1 through 3.

Figure 1:
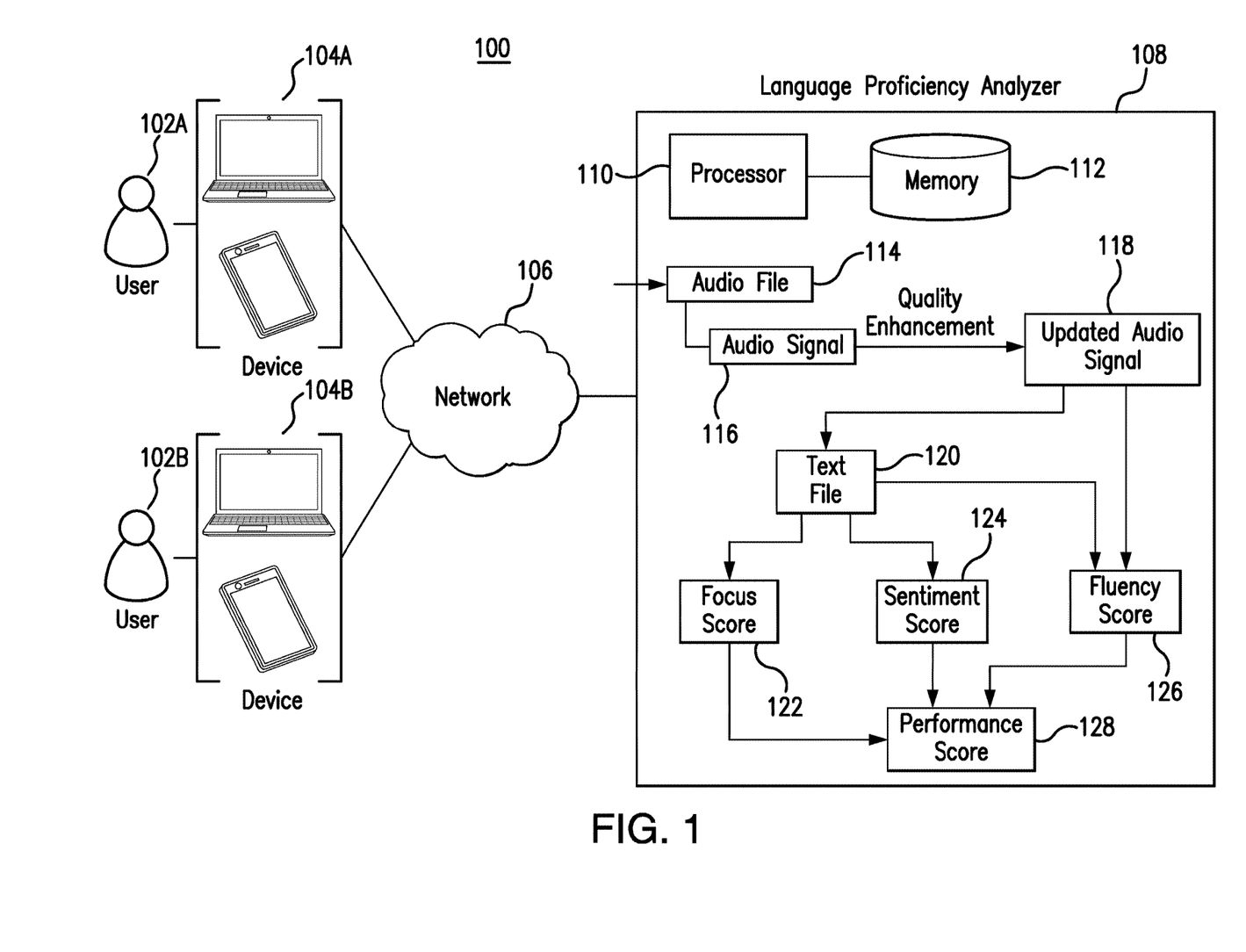
FIG. 1 illustrates an example system.

FIG. 1 illustrates an example system 100. As seen in FIG. 1, system 100 includes one or more devices 104, a network 106, and a language proficiency analyzer 108. Generally, language proficiency analyzer 108 automatically evaluates the language proficiency of the user's 102A and 102B of devices 104A and 104B. In this manner, the language proficiency of one of users 102A and 102B may be improved in particular embodiments.

Users 102 may use one or more devices 104 to communicate with one another. In the illustrated example of FIG. 1, user 102A uses one or more devices 104A to communicate with user 102B who uses one or more devices 104B. For example, user 102A may be a customer using a mobile phone or computer to communicate with user 102B who may be a support representative using a mobile phone or computer. The two users 102A and 102B may engage in an oral conversation with one another in a particular language. However, if that language is not the native language of user 102B, then the two users 102A and 102B may encounter issues during the conversation. For example, user 102A may have a difficult time understanding what user 102B is saying. If user 102B does not pronounce words properly or uses incorrect words, then user 102A may not understand the meaning of what user 102B is saying. As another example, the tone or word selection of user 102B may come off as terse or harsh to user 102A. Each of these issues may cause user 102A to have a negative experience with user 102B and may result in frustration and negativity. Thus, it is important to evaluate and improve the language proficiency of users 102.

Devices 104 include any appropriate device for communicating with components of system 100 over network 106. For example, devices 104 may be a telephone, a mobile phone, a computer, a laptop, a tablet, an automated assistant, and/or a cash register. This disclosure contemplates device 104 being any appropriate device for sending and receiving communications over network 106. As an example and not by way of limitation, device 104 may be a computer, a laptop, a wireless or cellular telephone, an electronic notebook, a personal digital assistant, a tablet, or any other device capable of receiving, processing, storing, and/or communicating information with other components of system 100. Device 104 may also include a user interface, such as a display, a microphone, keypad, or other appropriate terminal equipment usable by user 102. In some embodiments, an application executed by device 104 may perform the functions described herein.

Network 106 allows communication between and amongst the various components of system 100. For example, user 102 may use devices 104 to communicate over network 106. This disclosure contemplates network 106 being any suitable network operable to facilitate communication between the components of system 100. Network 106 may include any interconnecting system capable of transmitting audio, video, signals, data, messages, or any combination of the preceding. Network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Language proficiency analyzer 108 automatically, consistently, and accurately evaluates the language proficiency of users 102 in certain embodiments. As seen in FIG. 1, language proficiency analyzer 108 includes a processor 110 and a memory 112. This disclosure contemplates processor 110 and memory 112 being configured to perform any of the functions or actions of language proficiency analyzer 108 discussed herein. In certain embodiments, language proficiency analyzer 108 automatically improves the audio quality of audio signals and/or improves the language proficiency of a user 102 or an entire organization.

Processor 110 is any electronic circuitry, including, but not limited to microprocessors, application specific integrated circuits (ASIC), application specific instruction set processor (ASIP), and/or state machines, that communicatively couples to memory 112 and controls the operation of language proficiency analyzer 108. Processor 110 may be 8-bit, 16-bit, 32-bit, 64-bit or of any other suitable architecture. Processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 110 may include other hardware that operates software to control and process information. Processor 110 executes software stored on memory to perform any of the functions described herein. Processor 110 controls the operation and administration of language proficiency analyzer 108 by processing information received from devices 104, network 106, and memory 112. Processor 110 may be a programmable logic device, a microcontroller, a microprocessor, any suitable processing device, or any suitable combination of the preceding. Processor 110 is not limited to a single processing device and may encompass multiple processing devices.

Memory 112 may store, either permanently or temporarily, data, operational software, or other information for processor 110. Memory 112 may include any one or a combination of volatile or non-volatile local or remote devices suitable for storing information. For example, memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 112, a disk, a CD, or a flash drive. In particular embodiments, the software may include an application executable by processor 110 to perform one or more of the functions described herein.

Language proficiency analyzer 108 improves the quality of a received audio file 114. Audio file 114 may be of a recorded conversation between user 102A and user 102B. Audio file 114 may include one or more audio signals 116 that correspond to the words spoken by user 102A and user 102B. Language proficiency analyzer 108 enhances the quality of the one or more audio signals 116 through an automatic process using a neural network to produce an updated audio signal 118. This process of enhancing the quality of audio signals 116 will be described in more detail using FIGS. 2A and 2B. In this manner, language proficiency analyzer 108 improves the quality of one or more audio signals 116, which may make it easier to analyze the words spoken by users 102A and 102B.

Language proficiency analyzer 108 then performs a textual analysis and an audio analysis of updated audio signal 118. The textual analysis will be described in more detail using FIGS. 3A and 3B. The audio analysis will be described in more detail using FIGS. 4A and 4B.

During the textual analysis, language proficiency analyzer 108 converts the updated audio signal 118 to a text file 120. Text file 120 includes text representing the words spoken during the conversation between user 102A and user 102B. Text file 120 may be arranged as a transcript with indicators that show which user 102A or 102B said particular words represented by the text in the text file 120.

Language proficiency analyzer 108 then analyzes the text using a multi-attention network to produce a focus score 122 and a sentiment score 124. Focus score 122 indicates how focused or attentive a user 102A or 102B was on the other user 102A or 102B. For example, focus score 122 may indicate how engaged or caring one user 102A or 102B was to the other user 102A or 102B. For example, if a user 102A or 102B chose words that were responsive to statements or questions of the other user 102A or 102B, then focus score 122 would be higher. On the other hand, if the user 102A or 102B selected words that were hostile or unresponsive to the statements or questions of the other user 102A or 102B, the focus score 122 would be lower.

Sentiment score 124 indicates how a user 102A or 102B feels about the other user 102A or 102B. The more pleased a user 102A or 102B is with the other, the higher sentiment score 124 will be. For example, if a user 102A or 102B uses words with positive connotations (e.g., thank you, great, excellent, etc.), then sentiment score 124 may be higher for that user 102A or 102B. On the other hand, if the user 102A or 102B chooses words with negative connotations (e.g., dislike, upset, unhappy, etc.), then sentiment score 124 may be lower. In certain embodiments, language proficiency analyzer analyzes only words spoken by one user (e.g., a customer) to determine sentiment score 124.

During audio analysis, language proficiency analyzer 108 uses a neural network to analyze the updated audio signal 118 to evaluate fluency. Generally, language proficiency analyzer 108 compares updated audio signal 118 with the text representation of the audio signal to determine which words were spoken during the conversation and whether those words were pronounced properly (e.g., by evaluating pitch, intonation, etc.). Language proficiency analyzer 108 produces a fluency score 126 that indicates how well a user 102A or 102B spoke or pronounced the words during the conversation. The better the pronunciation, the higher fluency score 126.

Language proficiency analyzer 108 combines focus score 122, sentiment score 124, and fluency score 126 to produce a performance score 128. Performance score 128 may be any suitable combination of focus score 122, sentiment score 124, and/or fluency score 126. For example, performance score 128 may be a weighted average of focus score 122, sentiment score 124, and/or fluency score 126. Generally, the higher performance score 128 is, the more proficient user 102A or 102B is in a particular language. In certain embodiments, performance score 128 may be used to evaluate the language proficiency of a user 102A or 102B and to further improve the language proficiency of the user 102A or 102B.

Figure 2A:
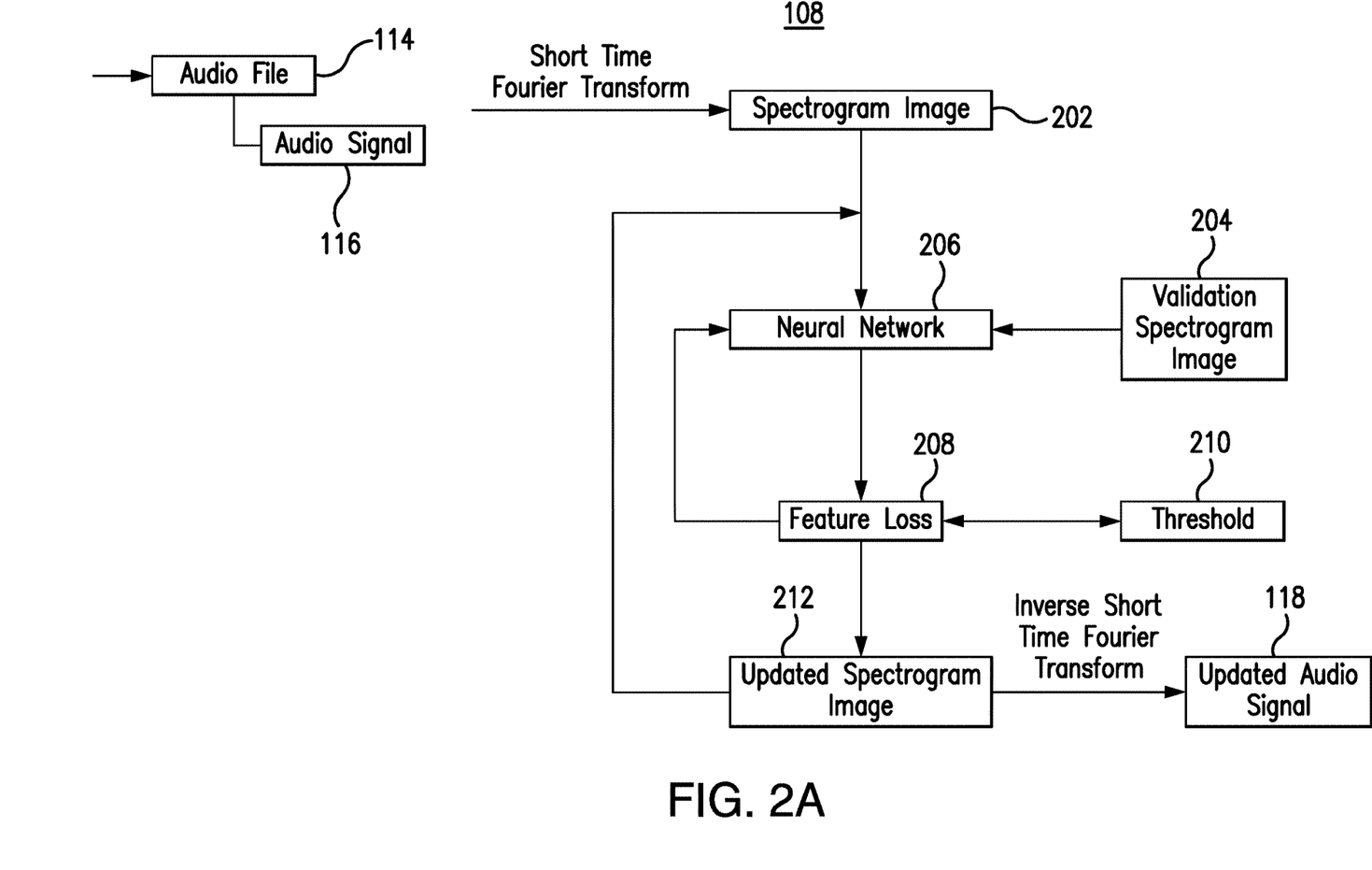
FIG. 2A illustrates an example language proficiency analyzer of the system of FIG. 1.
Figure 2B:
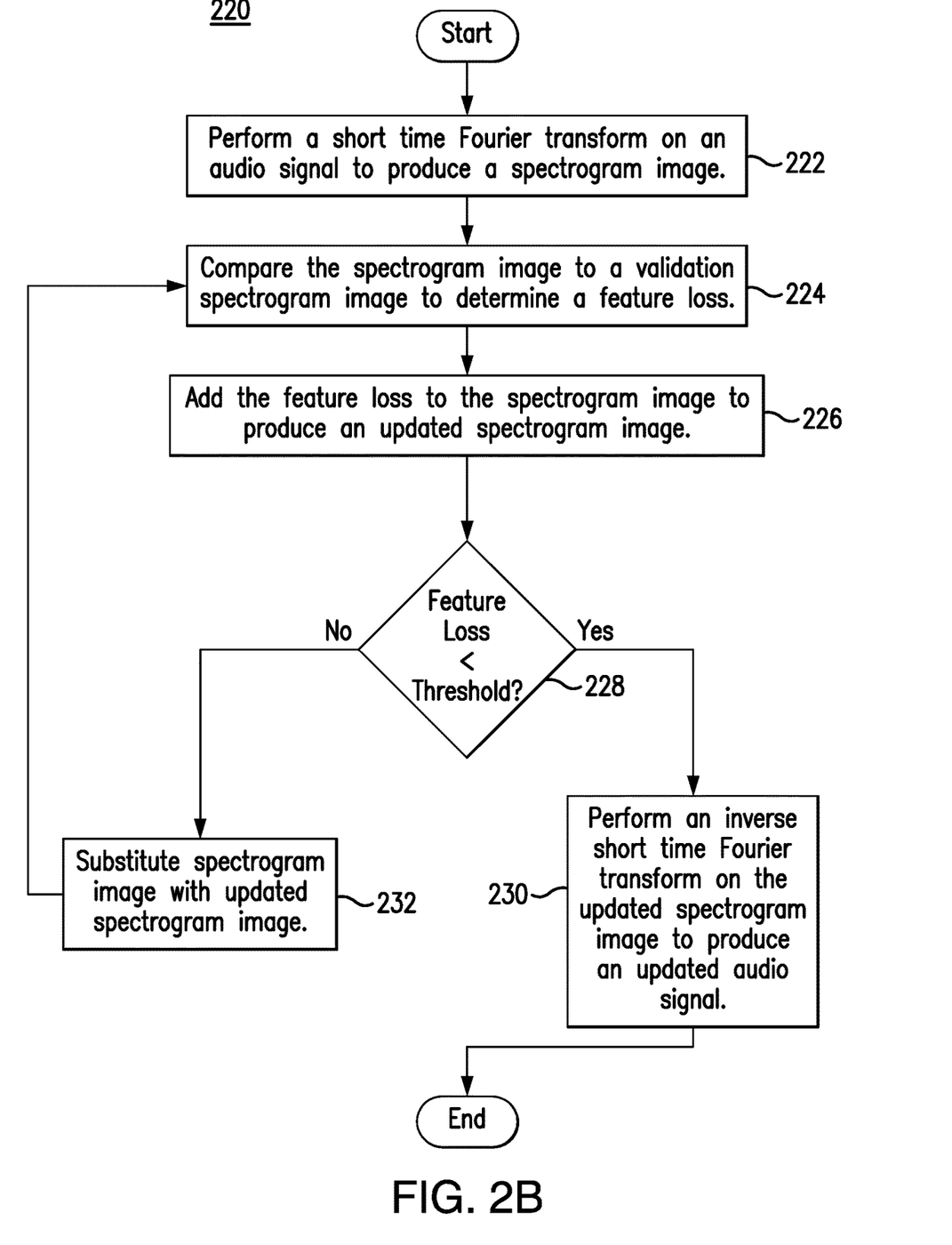
FIG. 2B is a flowchart illustrating a method of improving audio quality using the system of FIG. 1.

FIGS. 2A and 2B show an example language proficiency analyzer 108 of the system 100 of FIG. 1 improving audio quality. Generally, language proficiency analyzer 108 improves the quality of an audio signal by converting the audio signal into a spectrogram image and then analyzing the spectrogram image using a neural network. The neural network compares the spectrogram image with a validation spectrogram image to detect feature loss in the spectrogram image. Detected feature loss is then added back to the spectrogram image. This process continues iteratively until the detected feature loss is below a threshold. When the detected feature loss falls below the threshold, language proficiency analyzer 108 converts the spectrogram image back to an audio signal. In this manner, the quality of an audio signal is improved, so that the users 102 being recorded can be understood by listening to the audio signal. As a result, the language proficiency of a user 102 can be more accurately ascertained by listening to the audio signal.

FIG. 2A illustrates an example language proficiency analyzer 108 of the system 100 of FIG. 1. In the example of FIG. 2A, language proficiency analyzer 108 improves the quality of an audio signal 116. In particular embodiments, by improving the quality of audio signal 116, it becomes easier to understand what users 102 are saying during a recorded conversation. As a result, a more accurate assessment of language proficiency can be made.

Language proficiency analyzer 108 receives an audio file 114 containing audio signal 116. Audio file 114 may be a recorded conversation between users 102A and 102B. For example, audio file 114 may be a recorded conversation between a support representative and a customer. Audio signal 116 represents the audio portion of audio file 114. Language proficiency analyzer 108 performs certain operations on audio signal 116 to improve the quality of audio signal 116. For example, language proficiency analyzer 108 may increase the bitrate of audio signal 116 through the audio quality enhancement process. In certain embodiments, audio signal 116 may have a bitrate of at most 32 kilobits per second. Language proficiency analyzer 108 may improve the bitrate of audio signal 116 to be at least 64 kilobits per second in these embodiments.

Language proficiency analyzer 108 performs a short time Fourier transform on audio signal 116 to produce a spectrogram image 202. Generally, spectrogram image 202 is a pictorial representation of audio signal 116 in the frequency domain. By analyzing spectrogram image 202, language proficiency analyzer 108 can determine feature losses in audio signal 116 that reduce the quality of audio signal 116. By adding in these feature losses back to spectrogram image 202, language proficiency analyzer 108 improves the quality of spectrogram image 202 in audio signal 116.

Language proficiency analyzer 108 uses a neural network 206 to analyze spectrogram image 202. Generally, neural network 206 is trained to detect feature losses 208 in spectrogram image 202. Neural network 206 receives a validation spectrogram image 204. Generally, validation spectrogram image 204 may be a spectrogram image of an audio signal that has low or high quality. By training neural network 206 using validation spectrogram image 204, neural network 206 may learn what features of a spectrogram image indicate low or high quality. Validation spectrogram image 204 may be generated by performing a short time Fourier transform on a low quality audio signal (e.g., an audio signal with a bitrate of at most 32 kilobits per second) or a high quality audio signal (e.g., an audio signal with a bitrate of at least 64 kilobits per second). By using validation spectrogram image 204 to train a neural network 206, neural network 206 may learn the features of a spectrogram image that are missing from a low quality audio signal. These features should be added back in to the audio signal improve the quality of the audio signal.

Neural network 206 may compare spectrogram image 202 with one or more validation spectrogram images 204 to determine one or more feature losses 208 in spectrogram image 202. For example, neural network 206 may compare spectrogram image 202 with a validation spectrogram image 204 of a low or high quality audio signal to determine what features are absent from spectrogram image 202. These absent features are represented by feature loss 208.

Language proficiency analyzer 108 compares detected feature loss 208 with threshold 210 to determine if spectrogram image 202 is of a sufficient quality. Threshold 210 may be set by an administrator to be of any suitable value. When feature loss 208 is below threshold 210, language proficiency analyzer 108 may determine that spectrogram image 202 is of a sufficient quality. If feature loss 208 is greater than threshold 210, language proficiency analyzer 108 may determine that feature loss 208 is too great for spectrogram image 202 to be of a sufficient quality and continue with the audio quality enhancement process. If feature loss 208 is below threshold 210, language proficiency analyzer 108 may determine that the audio quality enhancement process is complete.

Language proficiency analyzer 108 adds feature loss 208 back into spectrogram image 202 to produce an updated spectrogram image 212. In this manner, updated spectrogram image 212 is of a higher quality than spectrogram image 202. Language proficiency analyzer 108 then sends updated spectrogram image 212 back through the audio quality enhancement process or converts updated spectrogram image 212 into an updated audio signal 118, depending on whether feature loss 208 is below or exceeds threshold 210. If feature loss 208 exceeds threshold 210, language proficiency analyzer 108 may send updated spectrogram image 212 back through the audio quality enhancement process. During that process, updated spectrogram image 212 effectively replaces spectrogram image 202. Neural network 206 compares updated spectrogram image 212 with the same or a new validation spectrogram image 204 to determine a feature loss 208. That feature loss 208 is then added to updated spectrogram image 212 to product a further updated spectrogram image of a higher quality. Language proficiency analyzer 108 then compares the new feature loss 208 with threshold 210 to determine if the further updated spectrogram image is of a sufficient quality. This process continues iteratively until the spectrogram image is of a sufficient quality as determined by threshold 210.

When feature loss 208 is below threshold 210, language proficiency analyzer 108 may determine that updated spectrogram image 212 is of a sufficient quality and exit the audio quality enhancement process. Language proficiency analyzer 108 may perform an inverse short time Fourier transform on updated spectrogram image 212 to produce an updated audio signal 118. Updated audio signal 118 should have improved audio quality relative to audio signal 116. For example, audio signal 116 may have a bitrate of at most 32 kilobytes per second, and updated audio signal 118 may have a bitrate of at least 64 kilobytes per second. By performing the audio quality enhancement process, language proficiency analyzer 108 automatically and efficiently improves the quality of audio signal 116 in certain embodiments.

In particular embodiments, language proficiency analyzer 108 retrains neural network 206 using detected feature loss 208. By training neural network 206 using detected feature loss 208, neural network 206 is able to detect feature loss 208 in future spectrogram images 202. For example, neural network 206 may learn that certain types of feature loss 208 are indicative of a low quality audio signal 116. In this manner, the performance of neural network 206 is improved in certain embodiments.

FIG. 2B is a flowchart illustrating a method 220 of improving audio quality using system 100 of FIG. 1. Generally, language proficiency analyzer 108 performs the steps of method 220. In particular embodiments, by performing method 220 the quality of an audio signal 116 is improved so that a more accurate evaluation of a user's 102 language proficiency can be made.

Language proficiency analyzer 108 begins by performing a short time Fourier transform on an audio signal 116 to produce a spectrogram image 202. Audio signal 116 may be of a recorded conversation between user 102A and user 102B. The conversation may be between a support representative and a customer. Spectrogram image 202 may be a pictorial representation of audio signal 116 in the frequency domain.

In step 224, language proficiency analyzer 108 compares the spectrogram image 202 to a validation spectrogram image 204 to determine a feature loss 208. Language proficiency analyzer 108 may use neutral network 206 to perform this comparison. Neural network 206 may be trained to detect a feature loss 208 in spectrogram images 202 that reduces the quality of audio signal 116. In step 226, language proficiency analyzer 108 adds the feature loss 208 to the spectrogram image 202 to produce an updated spectrogram image 212. In this manner, updated spectrogram image 212 has an improved quality over spectrogram image 202.

Language proficiency analyzer 108 then compares feature loss 208 to a threshold 210 in step 228. This comparison reveals whether updated spectrogram image 212 is of a sufficient quality. If feature loss 208 is below threshold 210, language proficiency analyzer 108 performs an inverse short time Fourier transform on the updated spectrogram image 212 to produce an updated audio signal 118 in step 230. Updated audio signal 118 will have an improved quality over audio signal 116. For example, audio signal 116 may have a bitrate of at most 32 kilobits per second, but updated audio signal 118 may have a bitrate of at least 64 kilobits per second.

If feature loss 208 exceeds threshold 210, language proficiency analyzer 108 may determine that updated spectrogram image 212 is not of a sufficient quality and continue through the audio quality improvement process iteratively. In step 232, language proficiency analyzer 108 substitutes spectrogram image 202 with updated spectrogram image 212. Then, language proficiency analyzer 108 returns to step 224 to determine a feature loss in updated spectrogram image 212. This process continues iteratively until the quality of the produced spectrogram image is of a sufficient quality, based on comparisons of feature loss 208 with threshold 210.

Figure 3A:
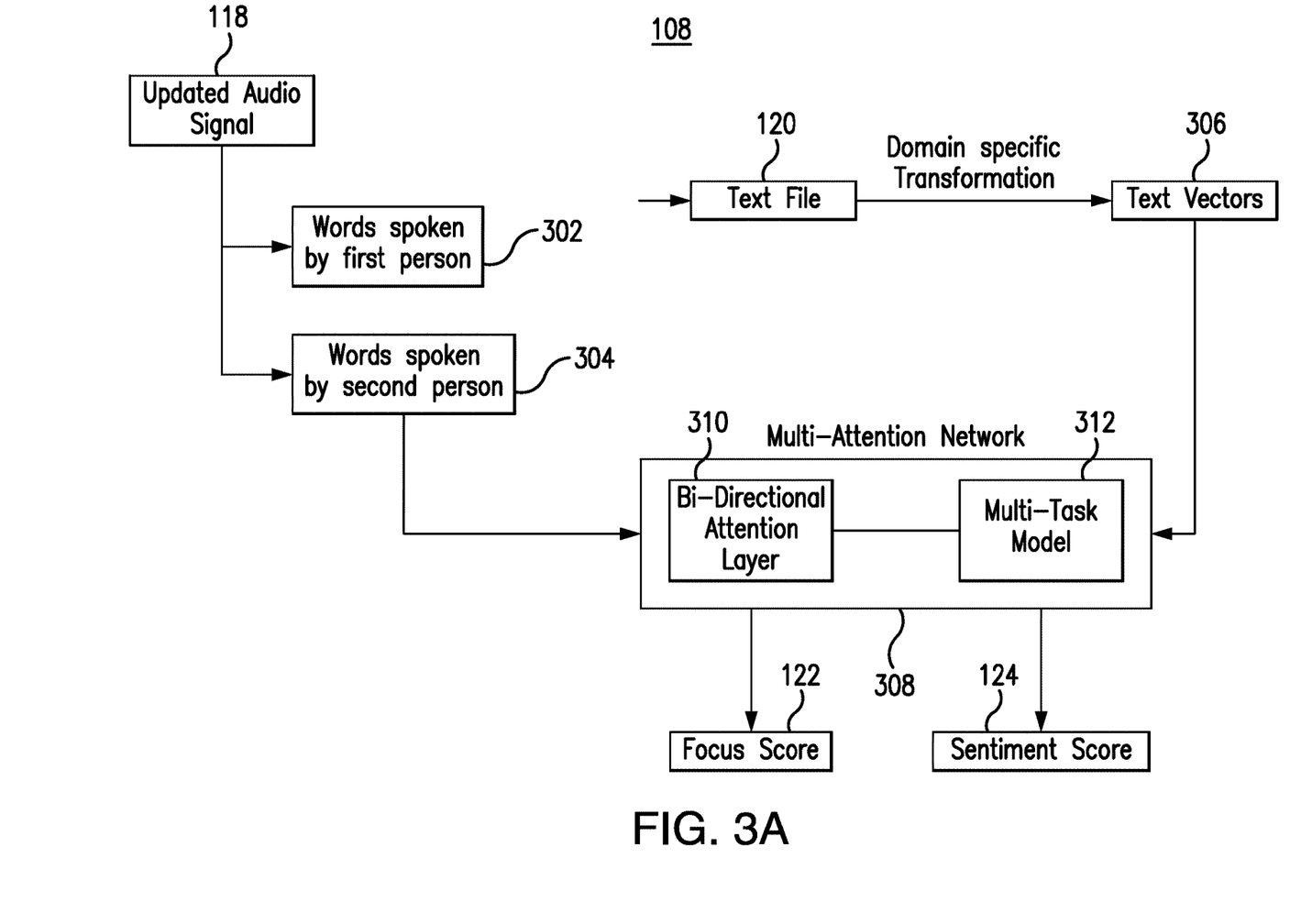
FIG. 3A illustrates an example language proficiency analyzer of the system of FIG. 1.
Figure 3B:
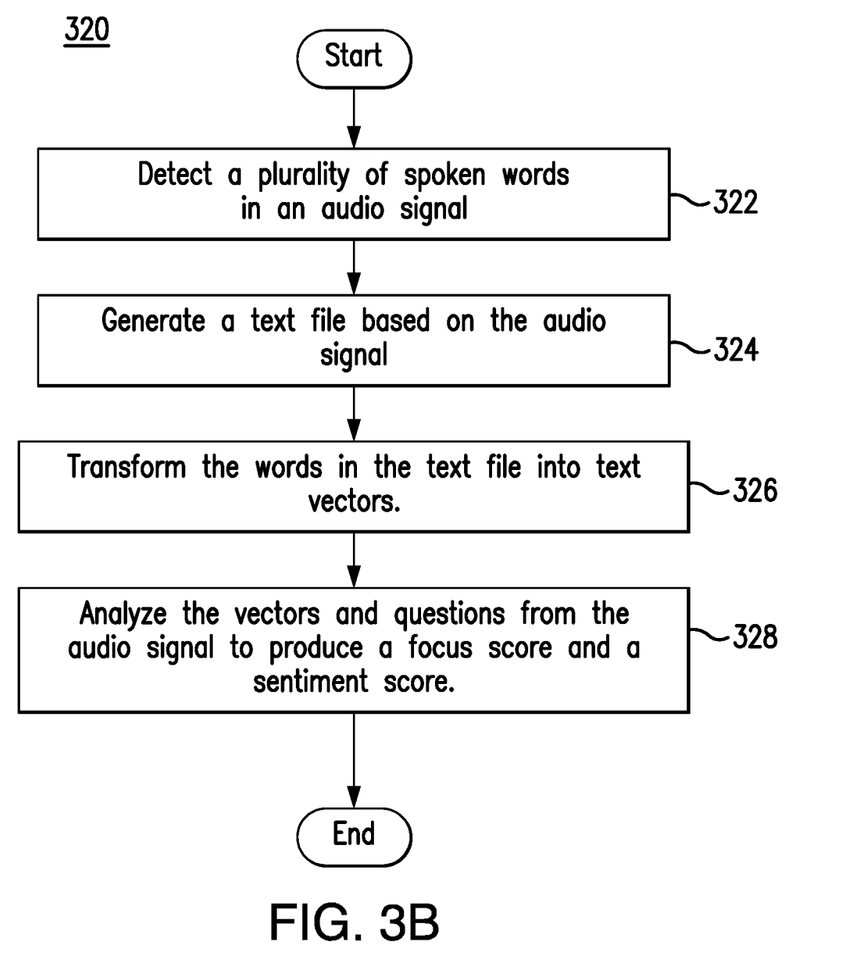
FIG. 3B is a flowchart illustrating a method of textual analysis using the system of FIG. 1.

FIGS. 3A and 3B show language proficiency analyzer 108 performing textual analysis to determine focus score 122 and sentiment score 124. Generally, language proficiency analyzer 108 converts updated audio signal 118 into text file 120. Language proficiency analyzer 108 then transforms the text in text file 120 into text vectors 306 indicative of the meaning of the text within text file 120. Language proficiency analyzer 108 then analyzes text vectors 306 using a multi-attention network 308 to produce focus score 122 and sentiment score 124.

Language proficiency analyzer 108 generates updated audio signal 118 through the audio quality enhancement process. The updated audio signal 118 may include the words spoken by user 102A and user 102B during a recorded conversation. As seen in FIG. 3A, updated audio signal 118 includes words spoken by a first person 302 and words spoken by a second person 304. Language proficiency analyzer 108 may analyze audio signal 118 to determine which person spoke which words. For example, language proficiency analyzer 108 can analyze the frequency, tone, and pitch of updated audio signals 118 to distinguish words that were spoken by a first person 302 and words that were spoken by a second person 304. Language proficiency analyzer 108 may analyze any suitable parameters to determine which words were spoken by which person.

Language proficiency analyzer 108 converts updated audio signal 118 to text file 120. Text file 120 includes a textual representation of the words that were spoken during the recorded conversation. In certain embodiments, language proficiency analyzer 108 may group the text in text file 120 chronologically and based on which person spoke the particular words. For example, text file 120 may resemble a transcript with designations of who spoke which words. Language proficiency analyzer 108 may employ any suitable speech to text transformation process to convert updated audio signal 118 to text file 120. For example, language proficiency analyzer 108 may use a dictionary that translates certain audio signals into a textual word for text file 120.

Language proficiency analyzer 108 transforms the text within text file 120 into text vectors 306. In particular embodiments, language proficiency analyzer 108 performs a domain specific transformation to produce text vectors 306. Text vectors 306 include vectors corresponding to words and/or phrases within text file 120. The orientation of each vector indicates a meaning of the corresponding word or phrase. Thus, if two words or phrases have very similar meanings, then their vectors 306 would have very similar or close orientations. On the other hand, if two words or phrases have very different meanings, then their vectors 306 would have very different orientations. By analyzing the orientations of vectors 306, the meanings of the words and phrases spoken by users 102A and 102B may be determined.

Language proficiency analyzer 108 uses a multi-attention network 308 to analyze text vectors 306 to produce focus score 122 and sentiment score 124. As seen in FIG. 3A, multi-attention network 308 includes a bi-directional attention layer 310 and a multi-task model 312. Generally, bi-directional attention layer 308 analyzes text vectors 306 to discern the meaning of words and/or phrases in text file 120. When predicting the meaning of a particular vector 306, bi-directional attention layer 310 analyzes vectors 306 that appear before and subsequent to the vector 306 being analyzed. The vectors 306 that appear prior may correspond with words that appear prior in text file 120. The vectors 306 that appear subsequent to the vector being analyzed may correspond to words that appears later in text file 120. In this manner, bi-directional attention layer 310 considers the context in which a particular word or phrase is being used in discerning or predicting its meaning.

Additionally, bi-directional attention layer considers the predicted meanings of several vectors 306 in predicting the meaning corresponding to a particular vector 306. The meanings of other vectors 306 may be allotted various weights depending on certain factors, such as proximity to the vector 306 being analyzed. In this manner, bi-directional attention layer 310 can accurately discern the meaning of words and/or phrases in text file 120.

The output of bi-directional attention layer 310 may be sent to multi-task model 312. Multi-task model 312 analyzes the predicted meaning of words and/or phrases in text file 120 to produce focus score 122 and sentiment score 124. Multi-task model 312 is trained to predict focus score 122 and sentiment score 124 in a singular model rather than with separate models. In this way, commonalities and different across these two tasks can be exploited to improve the efficiency of predicting focus score 122 and sentiment score 124. As discussed previously, focus score 122 indicates how attentive a person was to another person during a conversation. The more attentive the person is, the higher the score. Using the example of FIG. 1, the more attention the service representative is to the customer, the higher the focus score 122 for the service representative. Additionally, sentiment score 124 indicates how pleased one person is with the other during the conversation. The more pleased a person is with the other person in a conversation, the higher sentiment score 124 will be. Using the example of FIG. 1, sentiment score 124 may measure how pleased a customer is with the service representative.

As an example, focus score 122 may be determined by analyzing the words of a service representative and may reflect whether a service representative chose the appropriate words to be responsive to a customer's questions. For example, if the service representative selects incorrect words to respond to a question, then the response may be unresponsive, which lowers focus score 122. On the other hand, if the service representative selects words with the correct meanings to respond to the customer's question, then the response is considered responsive and focus score 122 increases. As another example, sentiment score 124 may be determined by evaluating the words of the customer. If the customer uses words with positive connotations, then sentiment score 124 may be higher to reflect that the customer is pleased with the service representative. On the other hand, if the customer uses words with negative connotations, then sentiment score 124 may be lower to reflect that the customer is not pleased with the service representative.

In particular embodiments, language proficiency analyzer may analyze the words of a particular person, such as words spoken by a first person 302 or words spoken by a second person 304 in determining focus score 122 or sentiment score 124. Using the example of FIG. 1, language proficiency analyzer 108 may analyze the questions asked by a customer and the words spoken by a service representative to determine focus score 122, which indicates how attentive and/or responsive the service representative is to the customer. As another example, language proficiency analyzer 108 may analyze spoken by the customer to produce sentiment score 124 which indicates how pleased the customer is with the service representative. In this manner, language proficiency analyzer 108 can isolate and analyze the words spoken by different individuals to arrive at the different scores.

FIG. 3B is a flowchart illustrating a method 320 of textual analysis using the system 100 of FIG. 1. Generally, language proficiency analyzer 108 performs method 320. In particular embodiments, by performing method 320, language proficiency analyzer 108 is able to accurately and consistently analyze the words spoken by an individual. Language proficiency analyzer 108 begins by detecting a plurality of spoken words in an audio signal 322. The audio signal may be a recorded conversation between two people. Language proficiency analyzer 108 analyzed these words to determine the language proficiency of either individual. In step 324, language proficiency analyzer 108 generates a text file based on the audio signal. Language proficiency analyzer 108 may use any suitable speech-to-text translator to convert the audio signal to a text file. The text file 120 may include text of the words spoken during the conversation.

Language proficiency analyzer 108 transforms the words in the text file 120 into text vectors 306 in step 326. Text vectors 306 may indicate the meaning of particular words and/or phrases in text file 120. Words and/or phrases that have similar meanings will have vectors 306 with similar orientations. Whereas words and/or phrases with different meanings will have vectors 306 with different orientations. Vectors 306 may be analyzed to ascertain the meanings of words and/or phrases in text file 120. In step 328, language proficiency analyzer 108 analyzes the vectors 306 and/or questions from the updated audio signal 118 to produce a focus score 122 and a sentiment score 124.

Figure 4A:
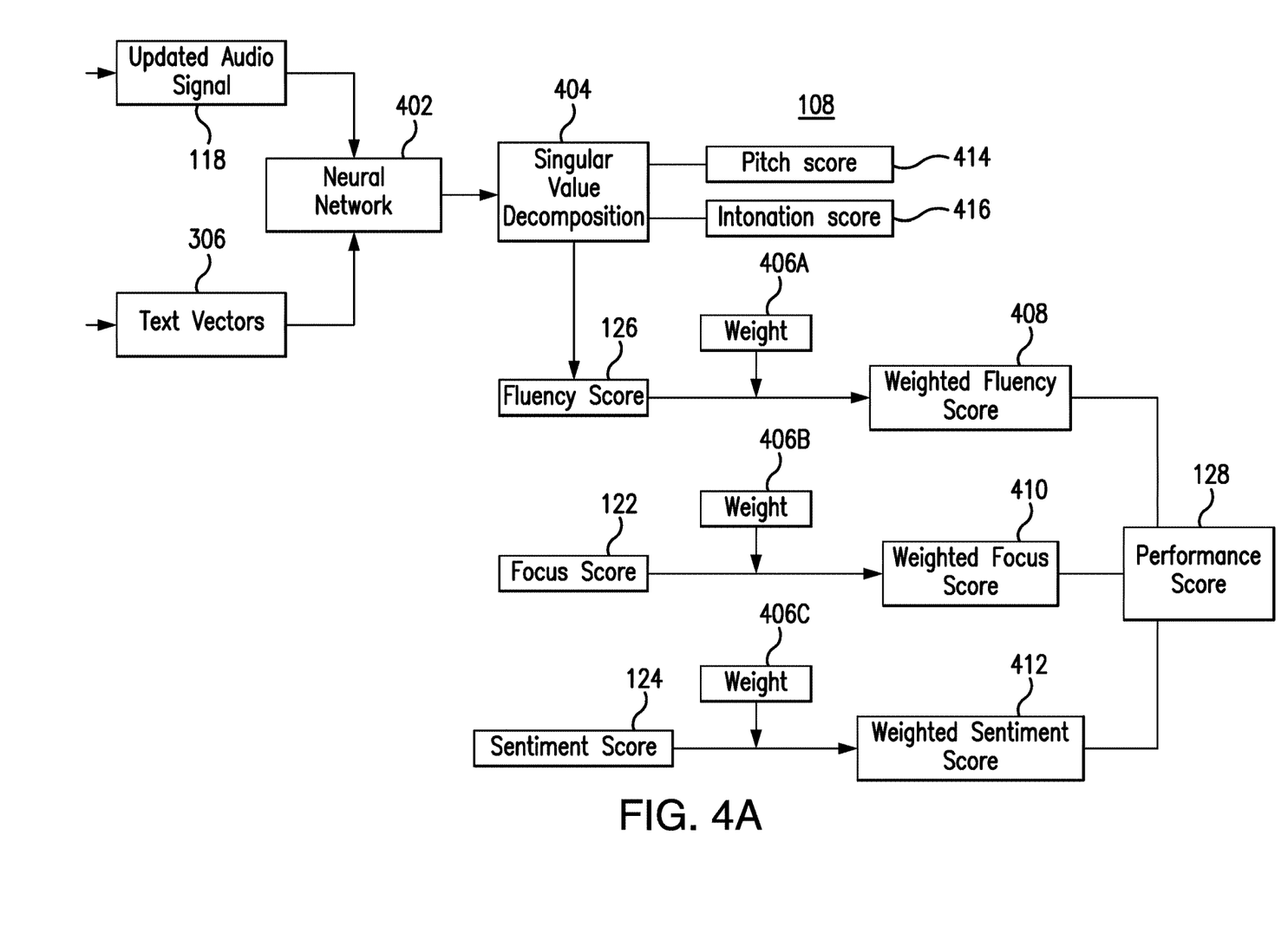
FIG. 4A illustrates an example language proficiency analyzer of the system of FIG. 1.
Figure 4B:
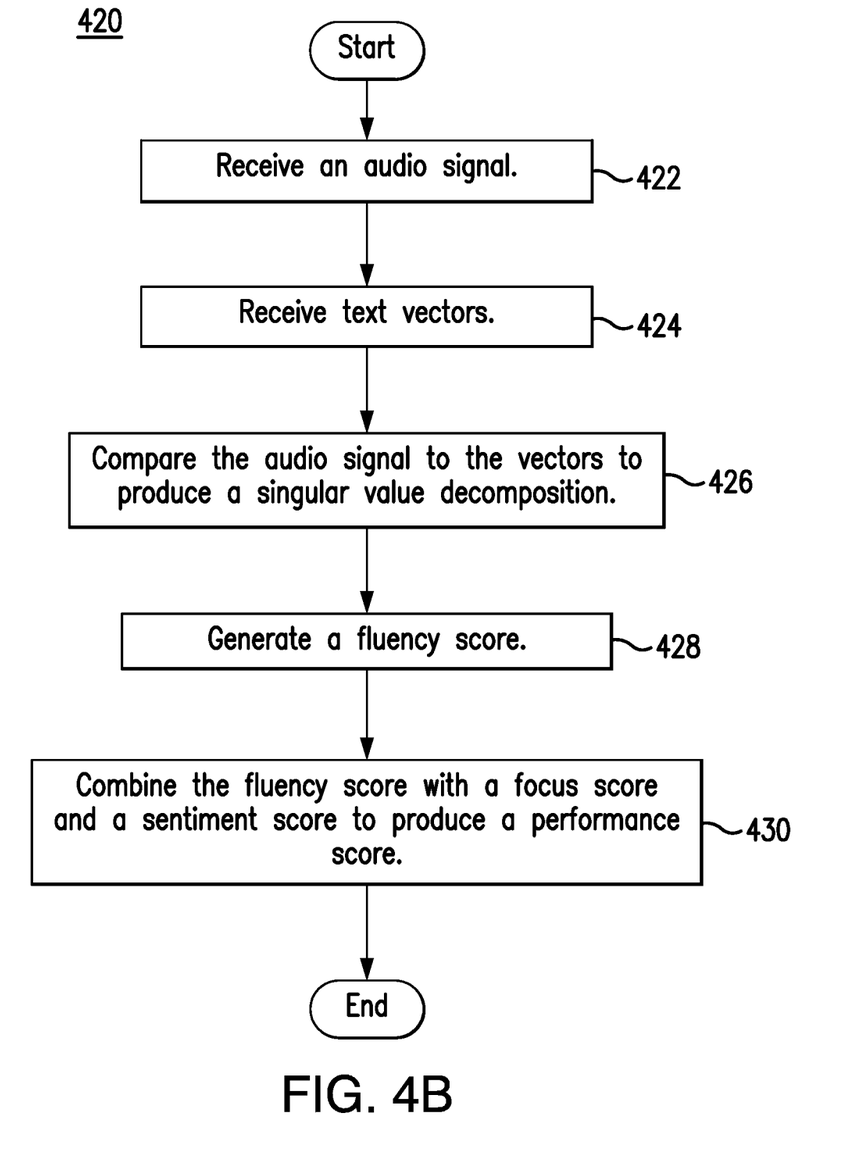
FIG. 4B is a flowchart illustrating a method of audio analysis using the system of FIG. 1.

FIGS. 4A and 4B show language proficiency analyzer 108 performing audio analysis of updated audio signal 118. Generally, language proficiency analyzer 108 uses a neural network to analyze updated audio signal 118 and text vectors 306 to determine how certain words sounded when spoken during the conversation. Language proficiency analyzer 108 produces a fluency score 126 to indicate how well these words were spoken and/or pronounced. Language proficiency analyzer 108 then combines the fluency score 126 with the focus score 122 and sentiment score 124 to produce a performance score 128. Performance score 128 indicates the language proficiency of a particular person.

Language proficiency analyzer 108 receives updated audio signal 118 and text vectors 306. As discussed previously, updated audio signal 118 may be produced through the audio quality enhancement process. Text vectors 306 are produced during the textual analysis process. Language proficiency analyzer 108 uses a neural network 402 to analyze updated audio signal 118 and text vectors 306. Neural network 402 may compare updated audio signal 118 with text vectors 306 to determine the words that were spoken at different points of updated audio signal 118. Neural network 402 may then analyze the audio signals for the spoken words to determine how the words sounded when spoken during the conversation. For example, neural network 402 may analyze the spoken words to determine whether they were pronounced correctly. In certain embodiments, language proficiency analyzer 108 determines which words were spoken by which users and then analyzes only the words spoken by a particular user (e.g., a service representative) during the audio analysis.

Neural network 402 produces a singular value decomposition 404 that indicates how well certain words or phrases were pronounced in updated audio signal 118. Singular value decomposition 404 may be one or more matrices that include a series of scores that indicate the pronunciation of certain words in updated audio signal 118. For example, the matrices may include pitch scores 414 and intonation scores 416 for various words and/or phrases in updated audio signal 118. Pitch score 414 may indicate whether a correct pitch was used in pronouncing a certain word or phrase. Intonation score 416 may indicate whether the correct intonation was used when pronouncing a certain word and/or phrase. These scores may reflect the pronunciation of the words and/or phrases in updated audio signal 118. Neural network 402 may determines these scores by comparing the audio signal in updated audio signal 118 corresponding to those words being spoken with a dictionary audio signal representing how the words sound when properly spoken. Deviations between the two audio signals is noted and scored in singular value decomposition 404.

Language proficiency analyzer 108 generates a fluency score 126 from the singular value decomposition 404. Fluency score 126 may combine the scores in the various matrices of singular value decomposition 404. Fluency score 126 may indicate how well a speaker pronounced words during a recorded conversation. Language proficiency analyzer 108 may generate fluency score 126 using any suitable process of combining one or more values in singular value decomposition 404.

Language proficiency analyzer 108 combines fluency score 126, focus score 122, and sentiment score 124 to produce performance score 128. In the illustrated example of FIG. 4A, language proficiency analyzer 108 applies weights 406 to these scores to produce weighted scores. Weight 406A is applied to fluency score 126 to produce a weighted fluency score 408. Weight 406B is applied to focus score 122 to produce a weighted focus score 410. Weight 406C is applied to sentiment score 124 to produce weighted sentiment score 412. The values of the weights 406 are adjusted based on the importance of a particular score to the overall language proficiency assessment. For example, if pronunciation is very important to an organization, an administrator may increase the value of weight 406A to emphasize the importance of proper pronunciation. On the other hand, if customer satisfaction is more important to the organization, the administrator may increase the value of weight 406C to emphasize the importance of sentiment score 124.

Language proficiency analyzer 108 combines weighted fluency score 408, weighted focus score 410, and weighted sentiment score 412 to produce performance score 128. In certain embodiments, language proficiency analyzer 108 may add weighted fluency score 408, weighted focus score 410, and weighted sentiment score 412 to produce performance score 128. As a result, performance score 128 is a weighted average of fluency score 126, focus score 122 and sentiment score 124. Performance score 128 indicates the overall language proficiency of an individual. The more proficient the individual is in a particular language, the higher performance score 128 is.

Performance score 128 may then be used to assess and improve the language proficiency of a user 102. For example, performance score 128 may indicate that the user 102 has lower than desired language proficiency and should be trained further in that language. The aspects of the performance score 128 (e.g., fluency score 126, focus score 122, and sentiment score 124) may reveal particular aspects of speech that the user 102 can practice to improve. For example, these scores may indicate that the user 102 should focus on pronunciation and/or word choice.

FIG. 4B is a flow chart illustrating a method 420 of audio analysis using the system 100 in FIG. 1. Generally a language proficiency analyzer 108 performs method 420. In particular embodiments, by performing method 420 language proficiency analyzer 108 analyzes the audio portion of a recorded conversation to improve language proficiency.

Language proficiency analyzer 108 begins by receiving an updated audio signal 118 in step 422. The updated audio signal 118 may have been generated through the audio quality enhancement process. In step 424, language proficiency analyzer 108 receives text vectors 306. Text vectors 306 may have been generated during the textual analysis process. Text vectors 306 may indicate the meanings of particular words or phrases spoken during the conversation.

Language proficiency analyzer 108 compares the updated audio signal 118 to the vectors 306 to produce a singular value decomposition 404. In certain embodiments, the language proficiency analyzer 108 may use neural network 402 to perform this comparison. The singular value decomposition 404 may include one or more matrices that indicate how well certain words were pronounced. Various factors may be analyzed to make this assessment, such as for example pitch and intonation. In step 428, language proficiency analyzer 108 generates a fluency score 126.

Language proficiency analyzer 108 may generate fluency score 126 from singular value decomposition 404. In step 430, language proficiency analyzer 108 combines the fluency score 126 with the focus score 122 and the sentiment score 124 to produce a performance score 128. In certain embodiments, performance score 128 may be a weighted average of fluency score 126, focus score 122, and sentiment score 124. The various weights may be adjusted to emphasize different aspects of language proficiency.

Modifications, additions, or omissions may be made to methods 220, 320, and 420 depicted in FIGS. 2B, 3B, and 4B. Methods 220, 320, and 420 may include more, fewer, or other steps. For example, steps may be performed in parallel or in any suitable order. While discussed as language proficiency analyzer 108 performing the steps, any suitable component of system 100, such as device(s) 104 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:
1. An apparatus comprising:
a memory; and
a hardware processor communicatively coupled to the memory, the hardware processor configured to:
perform a short time Fourier transform on an audio signal to produce a spectrogram image representing the audio signal;

compare the spectrogram image with a validation spectrogram image that is associated with a low quality audio signal, wherein the validation spectrogram image is used to identify at least one spectrogram image feature that is missing from the spectrogram image;

determine a first feature loss in the spectrogram image based at least in part upon the comparison between the spectrogram image and the validation spectrogram image, wherein the first feature loss is associated with the at least one spectrogram image feature;

add the first feature loss into the spectrogram image to produce an updated spectrogram image;

compare the first feature loss to a threshold;

if the first feature loss is below the threshold, perform an inverse short time Fourier transform on the updated spectrogram image to produce an updated audio signal; and if the first feature loss is above the threshold, compare the updated spectrogram image to the validation spectrogram image to determine a second feature loss.

2. The apparatus of claim 1, wherein the hardware processor is further configured to:

if the second feature loss is above the threshold:
add the second feature loss into the updated spectrogram image to produce a second updated spectrogram image;
compare the second feature loss to the threshold;
if the second feature loss is below the threshold, perform an inverse short time Fourier transform on the second updated spectrogram image to produce an updated audio signal; and
if the second feature loss is above the threshold, compare the second updated spectrogram image to the validation spectrogram image to determine a third feature loss.

3. The apparatus of claim 1, wherein:
a neural network compares the spectrogram image to the validation spectrogram image to determine the first feature loss and the second feature loss; and
the determined first feature loss and the second feature loss are used to train the neural network.

4. The apparatus of claim 1, wherein the validation spectrogram image is generated by performing a short time Fourier transform on an audio signal with a bitrate of at most 32 kilobits per second.

5. The apparatus of claim 1, wherein the updated audio signal is converted to text.

6. The apparatus of claim 1, wherein the audio signal is recorded from a telephone conversation.

7. The apparatus of claim 1, wherein the updated audio signal has a bitrate of at least 64 kilobits per second.

8. A method comprising:
performing, by a hardware processor communicatively coupled to a memory, a short time Fourier transform on an audio signal to produce a spectrogram image representing the audio signal;
comparing, by the hardware processor, the spectrogram image with a validation spectrogram image that is associated with a low quality audio signal, wherein the validation spectrogram image is used to identify at least one spectrogram image feature that is missing from the spectrogram image;
determining a first feature loss in the spectrogram image based at least in part upon the comparison between the spectrogram image and the validation spectrogram image, wherein the first feature loss is associated with the at least one spectrogram image feature;
adding, by the hardware processor, the first feature loss into the spectrogram image to produce an updated spectrogram image;
comparing, by the hardware processor, the first feature loss to a threshold;
if the first feature loss is below the threshold, performing, by the hardware processor, an inverse short time Fourier transform on the updated spectrogram image to produce an updated audio signal; and
if the first feature loss is above the threshold, comparing, by the hardware processor, the updated spectrogram image to the validation spectrogram image to determine a second feature loss.

9. The method of claim 8, further comprising:
if the second feature loss is above the threshold:
adding, by the hardware processor, the second feature loss into the updated spectrogram image to produce a second updated spectrogram image;
comparing, by the hardware processor, the second feature loss to the threshold;
if the second feature loss is below the threshold, performing, by the hardware processor, an inverse short time Fourier transform on the second updated spectrogram image to produce an updated audio signal; and
if the second feature loss is above the threshold, comparing, by the hardware processor, the second updated spectrogram image to the validation spectrogram image to determine a third feature loss.

10. The method of claim 8, wherein:
a neural network compares the spectrogram image to the validation spectrogram image to determine the first feature loss and the second feature loss; and
the determined first feature loss and the second feature loss are used to train the neural network.

11. The method of claim 8, wherein the validation spectrogram image is generated by performing a short time Fourier transform on an audio signal with a bitrate of at most 32 kilobits per second.

12. The method of claim 8, wherein the updated audio signal is converted to text.

13. The method of claim 8, wherein the audio signal is recorded from a telephone conversation.

14. The method of claim 8, wherein the updated audio signal has a bitrate of at least 64 kilobits per second.

15. A system comprising:
a device; and
a language proficiency analyzer comprising a hardware processor communicatively coupled to a memory, the hardware processor configured to:
perform a short time Fourier transform on an audio signal of a conversation that occurred using the device to produce a spectrogram image representing the audio signal;
compare the spectrogram image with a validation spectrogram image that is associated with a low quality audio signal, wherein the validation spectrogram image is used to identify at least one spectrogram image feature that is missing from the spectrogram image;
determine a first feature loss in the spectrogram image based at least in part upon the comparison between the spectrogram image and the validation spectrogram image, wherein the first feature loss is associated with the at least one spectrogram image feature;

add the first feature loss into the spectrogram image to produce an updated spectrogram image;

compare the first feature loss to a threshold;

if the first feature loss is below the threshold, perform an inverse short time Fourier transform on the updated spectrogram image to produce an updated audio signal; and if the first feature loss is above the threshold, compare the updated spectrogram image to the validation spectrogram image to determine a second feature loss.

16. The system of claim 15, wherein the hardware processor is further configured to:

if the second feature loss is above the threshold:

add the second feature loss into the updated spectrogram image to produce a second updated spectrogram image;

compare the second feature loss to the threshold;

if the second feature loss is below the threshold, perform an inverse short time Fourier transform on the second updated spectrogram image to produce an updated audio signal; and if the second feature loss is above the threshold, compare the second updated spectrogram image to the validation spectrogram image to determine a third feature loss.

17. The system of claim 15, wherein:

a neural network compares the spectrogram image to the validation spectrogram image to determine the first feature loss and the second feature loss; and the determined first feature loss and the second feature loss are used to train the neural network.

18. The system of claim 15, wherein the validation spectrogram image is generated by performing a short time Fourier transform on an audio signal with a bitrate of at most 32 kilobits per second.

19. The system of claim 15, wherein the updated audio signal is converted to text.

20. The system of claim 15, wherein the audio signal is recorded from a telephone conversation.

\* \* \* \* \*